United States Patent [19]

Opitz

[11] 4,443,224
[45] Apr. 17, 1984

[54] LIQUID REACTIVE DYESTUFF PREPARATIONS AND THEIR USE

[75] Inventor: Konrad Opitz, Liederbach, Fed. Rep. of Germany

[73] Assignee: Hoechst Aktiengesellschaft, Frankfurt am Main, Fed. Rep. of Germany

[21] Appl. No.: 393,717

[22] Filed: Jun. 30, 1982

[30] Foreign Application Priority Data

Jul. 2, 1981 [DE] Fed. Rep. of Germany ....... 3126081

[51] Int. Cl.$^3$ .......................... C09B 62/02; D06P 1/38
[52] U.S. Cl. ............................................ 8/527; 8/543; 8/549; 8/582; 8/586; 8/917; 8/918; 8/924
[58] Field of Search .................... 8/549, 543, 589, 527, 8/582, 586

[56] References Cited

U.S. PATENT DOCUMENTS

| | | | |
|---|---|---|---|
| 4,072,463 | 2/1978 | Schlafer et al. | 8/527 |
| 4,078,884 | 3/1978 | Opitz et al. | 8/527 |
| 4,088,441 | 5/1978 | Meininser et al. | 8/589 |
| 4,118,184 | 10/1978 | Opitz et al. | 8/527 |
| 4,149,850 | 4/1979 | Schlafer et al. | 8/527 |
| 4,264,323 | 4/1981 | Capponi et al. | 8/527 |
| 4,349,349 | 9/1982 | Nakatsuka et al. | 8/527 |
| 4,351,640 | 9/1982 | Schaffer et al. | 8/524 |

FOREIGN PATENT DOCUMENTS

| | | |
|---|---|---|
| 42355 | 12/1981 | European Pat. Off. . |
| 2529658 | 1/1977 | Fed. Rep. of Germany . |
| 1063063 | 2/1967 | United Kingdom . |
| 1060063 | 2/1967 | United Kingdom . |
| 1197520 | 7/1970 | United Kingdom . |

OTHER PUBLICATIONS

European Publication No. 24654 (Chemical Abstracts, vol. 95 (1981), page 67, Item 26558z).

*Primary Examiner*—A. Lionel Clingman
*Attorney, Agent, or Firm*—Curtis, Morris & Safford

[57] ABSTRACT

The invention relates to liquid reactive dyestuff preparations containing one or several dyestuffs, the chromophore of which has of from 1 to 8 SO$_3$H groups and of from 1 to 3 fiber-reactive groups, a solubilizer, an anionic dispersing agent and buffer substances and having a pH of from 3 to 7. These preparations are particularly stable to storage and are suitable for dyeing and printing natural and synthetic fiber material.

8 Claims, No Drawings

LIQUID REACTIVE DYESTUFF PREPARATIONS AND THEIR USE

Reactive dyestuffs are used on a large scale in the form of dry powders containing non-coloring extenders for dyeing and printing nitrogen-containing fiber material such as wool or silk or synthetic polyamide fibers, and especially fiber material made from natural or regenerated cellulose. The preparation of printing pastes, of padding liquors and of dyebaths using said dyestuff powders is rendered difficult not only by the disagreeable dust formation due to the powder form, but also by the fact that many of the dyestuff powders have unsatisfactory wetting properties because of their content of mineral oil-containing dust collectors, which may result in oily deposits, that they tend to clog or that they have an unsatisfactory solubility.

These disadvantages of dyestuff powders are particularly disagreeable in dyeing processes, wherein high dyestuff concentrations, at low temperatures, have to be attained, for example in short-dwell padding processes. These processes require liquid dyeing preparations that are distinctly superior to preparations in powder form. When water is used as the solvent, liquid preparations having dyestuff contents of practical interest can be obtained only if the reactive dyestuff has relatively good solubility. Such liquid preparations of reactive dyestuffs are known, for example, from U.S. Pat. Nos. 4,072,463, 4,078,884 and 4,149,850.

In the case of reactive dyestuff having a limited solubility, water is unsuitable as the sole solvent for making liquid preparations having dyestuff contents of practical interest. These dyestuffs require an addition of solubilizers such as ε-caprolactam, tetramethyl urea, tetramethylene sulfone, dimethyl formamide or other suitable substances. Such liquid preparations of reactive dyestuffs are described in British Pat. No. 1,060,063 or in German Offenlegungsschrift No. 2,529,658.

It has developed, however, that the solubility of a number of reactive dyestuffs is so low that a complete dissolution is not reached in the case of dyestuff contents of practical interest although solubilizers have been used or that the making of liquid preparations having a sufficient concentration is possible, but that said preparations have unsatisfactory stability to storage. This unsatisfactory stability to storage becomes evident by the fact that undissolved deposits at the bottom are formed after a more or less extended period of time. A complete homogeneity of the liquid dyeing preparation is therefore ensured no longer and there is the danger of obtaining dyeings and prints having undesirable specks or an undesirable varying tinctorial strength.

Now, it has been found that these disadvantages are avoided by using anionic dispersing agents. According to the present invention therefore stable liquid water-containing dyeing preparations of reactive dyestuffs are characterized by a content of from 5 to 35, preferably 5 to 25, weight %, of one or several dyestuffs, which in the form of the free acid correspond to the formula (I)

$$(HO_3S)_m-F-Z_n \qquad (I)$$

wherein

F is the radical of a chromophore of a known anthraquinone, mono-, dis- or triazo dyestuff or of a phthalocyanine dyestuff, the phthalocyanine dyestuffs as well as the azo dyestuffs being optionally present as metal complexes containing Cu, Cr, Co, Ni or Fe as complex-forming central atom, m is an integer of from 1 to 8, n is an integer of from 1 to 3 and Z is a fiber reactive group selected from the series of monohalogen-symmetric-triazinyl, mono-, di- or trihalogen pyrimidine, mono- or dichloroquinoxaline or dichlorophthalazine, dichloroquinazoline or dichloropyridazone or of bromine or fluorine derivatives thereof, of the series of sulfonyl group(s)-containing triazinyl, of sulfonyl group(s)-containing pyrimidine or of ammonium group(s)-containing triazinyl or of the series of pyrimidine- or ammonium group(s)-containing triazinyl, or of the aliphatic series, of from 5 to 25, preferably 10 to 25, weight % of a solubilizers incapable of reacting with the dyestuff so as to reduce its tinctorial strength, especially with the reactive groups Z, of from 1 to 20, preferably 1 to 10, weight % of an anionic dispersing agent and of from 1 to 6, preferably 1 to 4, weight % buffer substances incapable of reacting with the fiber reactive groups Z so as to reduce the tinctorial strength, and characterized by a pH of from 3 to 7, preferably of from 4.5 to 6.5.

Dyeing preparations having a dyestuff content of from 10 to 25 weight % are particularly preferred. The invention is particularly advantageous in the case of dyestuffs of formula (I) wherein m is 1 or 2, that means, dyestuffs containing at the radical F only 1 or 2 sulfo groups.

Preference is given moreover to dyestuffs the fiber-reactive group Z of which belong to the aliphatic series such as vinylsulfonyl, β-chloroethylsulfonyl, β-acetoxyethylsulfonyl, β-(3-sulfobenzoyloxy)-ethylsulfonyl, β-sulfatoethylsulfonyl, β-thiosulfatoethylsulfonyl, β-phosphatoethylsulfonyl, β-sulfatoethylsulfonylmethylamino or vinylsulfonylmethylamino.

Preferred solubilizers are the polar solvents tetramethyl urea, dimethyl formamide, N-methylacetamide, dimethyl sulfoxide, tetramethylene sulfone, N-methyl pyrrolidone, phosphoric acid tris-(dimethyl)amide, diethylene glycol dimethyl ether and analogous compounds, in particular ε-caprolactam.

Dyeing preparations according to the invention that contain one or several dyestuffs having a vinylsulfonyl, β-sulfatoethylsulfonyl, β-thiosulfatoethylsulfonyl or a β-acetoethylsulfonyl radical are particularly preferred.

Preferred dyeing preparations contain anionic dispersing agents selected from the group consisting of alkali metal lignine sulfonates, condensation products of phenols such as m-cresol, formaldehyde and sulfites such as sodium bisulfite, condensation products of naphthalenesulfonic acids or alkylnaphthalene sulfonic acids and of formaldehyde and in particular sulfosuccinic acid derivatives, in particular those as described in U.S. Pat. No. 3,775,056, as well as sulfosuccinic acid derivatives, the hydrophobic radical of which is derived from a fatty amine.

Suitable buffer substances are, for example, sodium and potassium acetate, sodium and potassium oxalate, various primary, secondary and tertiary sodium and potassium salts of phosphoric acid or mixtures thereof as well as sodium borate. Sodium borate and primary and secondary sodium phosphate are preferred.

Particularly preferred are preparations according to the invention of the dyestuff C. I. Reactive Yellow 37 that contain of from 5 to 25 weight % of said dyestuff, of from 5 to 25, preferably 10 to 20, weight % of ε-caprolactam, of from 1 to 10, preferably 1 to 5, weight % of an anionic dispersing agent of the series of sulfosuccinic acid derivatives and of from 1 to 6 weight % of buffer substances, and which have a pH of from 3 to 7, preferably of 4.5 to 6.5.

The liquid dyeing preparations according to the invention are obtained by dissolving the reactive dyestuffs in water while using said solubilizers, anionic dispersing agents and buffer substances. When there are added no anionic dispersing agents to the dyeing preparations, the dyestuffs precipitate upon more or less extended storage, as a result of initially supersaturated solutions or of difficulty soluble dyestuff particles formed during storage.

This dyestuff precipitation may result in specky dyeings and prints and in dyeings and prints of varying tinctorial strength, since satisfactory homogeneity is no longer ensured in the case of liquid dyeing preparations containing a sediment.

The making of the liquid dyeing preparations according to the invention is carried out in the following manner: The reactive dyestuff salts are stirred in dry or humid form, for example, as humid filter cake, with the buffer substance at room temperature or at elevated temperature of up to 50° C. in an aqueous solution of the solubility-increasing additive (solubilizes) and of the anionic dispersing agent, dissolved in said solution and optionally clarified.

A further mode of making said liquid dyeing preparation is as follows: The solubility-increasing additive, the anionic dispersing agent and the buffer substance are added to the solution or suspension obtained in the dyestuff synthesis, whereupon the water is partly distilled off under reduced pressure, to obtain a higher dyestuff content or further quantities of solid reactive dyestuff obtained by drying part of the solution obtained during the synthesis step are added and dissolved in said solution or suspension.

The liquid reactive dyestuff preparations according to the invention are particularly stable to storage and result in no dyestuff precipitation even upon storage for several weeks at elevated temperature or several months at room temperature. Moreover, the reactivity of the dyestuffs is not impaired so that losses of tinctorial strength do not occur.

Owing to said advantageous properties, the preparations according to the invention are particularly suitable for dyeing and printing natural fiber material, for example wool and silk, and synthetic polyamide fiber material or fiber material made from natural or regenerated cellulose, for example cotton, linen, rayon staple and viscose rayon, as well as mixtures of fibers containing one or several of said fibers. The dyeing preparations according to the invention are particularly suitable for preparing padding liquors and dyebaths as well as printing pastes.

The following examples illustrate the invention. Parts and percentages are by weight.

EXAMPLE 1

59 Parts of pulverulent C.I. Reactive Yellow 37 having a content of pure dyestuff of 70% were introduced into a solution of 8 parts of disodium hydrogenophosphate, 60 parts of ε-caprolactam and 20 parts of a 35 weight % aqueous solution of the sulfosuccinic acid derivative of the tallow fatty alkylamine of the formula

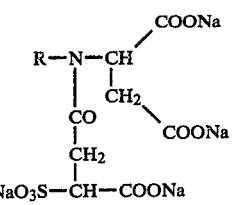

wherein R is a mixture of fatty alkyl radicals having the following chain distribution: $C_{14}$ about 5%, $C_{16}$ about 30%, $C_{18}/C_{18}$ unsaturated about 65%, hereinafter referred to as "dispersing agent I", in 240 parts of water. Upon several hours' stirring at 50° C. and upon cooling to room temperature, the volume of the solution was completed to 400 parts by adding water. The resulting solution contained 10.3 weight % of pure dyestuff C.I. Reactive Yellow 37 and had a pH of 6.3 at 20° C.

This liquid dyeing preparation, when kept in a closed vessel, is stable to storage for at least 3 months at 20° C. or for 6 weeks at 50° C., whereas a corresponding dyeing formulation having the same dyestuff concentration, but which has been prepared without the dispersing agent I, shows distinct precipitation of dyestuff after 1 to 3 days.

Dyebaths, padding liquors and printing pastes were prepared in known and usual manner by using 4 parts of the pH-stabilized solution thus obtained. When said dyebaths, padding liquors and printing pastes were applied to and fixed on cotton in the manner usual for reactive dyestuffs, there were obtained dyeings and prints of the same tinctorial strength as of those prepared by using dyebaths, padding liquors or printing pastes of the same concentration and which contained 1 part of a pulverulent preparation containing 41.2 weight % of pure dyestuff.

EXAMPLE 2

To 523 parts of an aqueous clarified dyestuff solution of C.I. Reactive Yellow 37 having a pH of 5.5 and a dyestuff content of 7.9 weight %, which had been prepared in the usual manner—synthesis of the dyestuff by diazotizing and coupling the corresponding starting compounds — there were added 8 parts of sodium oxalate, 60 parts of ε-caprolactam and 20 parts of a 35 weight % aqueous solution of the dispersing agent I. 111 Parts of water were distilled off from said solution at 50° C. under a pressure of 24 mbar, while stirring. The resulting 400 parts of dyestuff solution contained 10.3 weight % of pure dyestuff C.I. Reactive Yellow 37 and had a pH of 6.1.

The liquid dyeing preparation had the same advantageous properties as described in Example 1.

EXAMPLE 3

This example was carried out analogously to Example 1 replacing, however, 8 parts of disodium hydrogenophosphate by 12 parts of sodium borate. There were obtained 400 parts of a liquid dyeing preparation which had a pH of 5.9 at 20° C. and which was distinguished by the same advantageous properties as the dyeing preparation obtained in Example 1.

EXAMPLE 4

This example was carried out analogously to Example 1 replacing, however, 8 parts of disodium hydrogenophosphate by 15 parts of sodium acetate. There were obtained 400 parts of a liquid dyeing preparation which had a pH of 6.1 at 20° C. and was distinguished by the same advantageous properties as the dyeing preparation obtained in Example 1.

EXAMPLE 5

This example was carried out analogously to Example 1, replacing, however, 20 parts of the 35 weight % aqueous solution of the dispersing agent I by 25 parts of a 35 weight % aqueous solution of the sulfosuccinic acid semiester known from Example B of U.S. Pat. No. 3,775,056 (hereinafter referred to as "dispersing agent II"). There was obtained a liquid dyeing preparation having the same advantageous properties as the dyeing preparation obtained in Example 1.

EXAMPLE 6

When replacing in Example 1 20 parts of the 35 weight % aqueous solution of dispersing agent I by 10 parts of a sulfosuccinic acid semiester which had been obtained by reacting a novolak oxethylated with 105 mols of ethylene oxide and which contained nonylphenol radicals bonded via methylene bridges, with maleic anhydride and sodium sulfite analogously to substance 24 of U.S. Pat. No. 3,775,056, there was obtained a liquid dyeing formulation stable to storage.

EXAMPLE 7

70 Parts of pulverulent C.I. Reactive Red 174 having a content of pure dyestuff of 71.5 weight % were introduced into a solution of 6 parts of disodium hydrogenophosphate, 60 parts of ε-caprolactam and 20 parts of a 35 weight % aqueous solution of dispersing agent II in 240 parts of water and dissolved therein while stirring for several hours at 50° C. Upon cooling to 20° C. the volume was completed to 400 parts while adding water and the solution was clarified from undissolved impurities. The resulting solution contained 12.5 weight % of pure dyestuff Reactive Red 174 and had a pH of 6.0 at 20° C.

When kept in a closed vessel, the liquid dyeing preparation thus obtained was stable to storage for at least 3 months at room temperature or for 6 weeks at 50° C., whereas a corresponding dyeing preparation which had the same dyestuff concentration, but which had been prepared without using dispersing agent II, showed distinct dyestuff precipitation after some days.

Using 4 parts of said pH-stabilized solution there were prepared dyebaths, padding liquors and printing pastes in the usual manner, which, when applied to and fixed on cotton in the manner usual for reactive dyestuffs, yielded red dyeings and prints. Said dyeings and prints had the same tinctorial strength as those obtained with the use of dyebaths, padding liquors and printing pastes containing 1 part of a pulverulent preparation having a content of pure dyestuff of 50%.

EXAMPLE 8

75 Parts of pulverulent C.I. Reactive Red 180 having a content of pure dyestuff of 67% were introduced into a solution of 8 parts of disodium hydrogenophosphate, 50 parts of diethylene glycol dimethyl ether and 20 parts of a 35 weight % aqueous solution of dispersing agent I in 250 parts of water and were dissolved therein by stirring for several hours at 50° C. Upon cooling to 20° C., the volume was completed to 400 parts by adding water and the solution was clarified by removing undissolved impurities.

The resulting liquid dyeing preparation contained 12.5 weight % of pure dyestuff C.I. Reactive Red 180, had a pH of 6.2 at 20° C. and was distinguished by the same advantageous properties as the liquid dyeing formulation described in any of Examples 1 to 7.

What is claimed is:

1. A liquid water-containing dyeing preparation which comprises from 10 to 25 weight percent of one or more reactive dyestuffs, said one or more dyestuffs when in the free acid form being of the formula $$(HO_3S)_m-F-Z_n$$

wherein

F is the radical of a chromophore of an anthraquinone dyestuff, mono-, dis- or trisazo dyestuff or of a phthalocyanine dyestuff, m is an integer of from 1 to 8, n is an integer of from 1 to 3 and z is one or more fiber reactive radicals of monohalogen-symmetric-triazine; of mono- di- or trihalogen pyrimidine; of mono- or dichloroquinoxaline or dichlorophthalazine or dichloroquinazoline or dichloropyridazone, or bromine or fluorine derivatives thereof; or of sulfonyl-containing triazine, sulfonyl-containing pyrimidine or ammonium-containing triazine; or of pyrimidine-containing triazine; or of the aliphatic series;

from 5 to 25 weight percent of one or more solubilizers selected from the group consisting of tetramethyl urea, dimethyl formamide, N-methylacetamide, dimethyl sulfoxide, tetramethylene sulfone, N-methyl pyrrolidone, phosphoric acid tris-(dimethyl)amide, diethylene glycol dimethyl ether and ε-caprolactam;

from 1 to 20 weight percent of a sulfosuccinic acid derivative which is a semi-ester or a sulfosuccinic acid amide; and from 1 to 6 weight percent buffer which does not react with Z so as to reduce the tinctorial strength in any substantial degree;

said dyeing preparation exhibiting a pH of from 3 to 7.

2. The dyeing preparation as defined in claim 1, wherein Z is a fiber-reactive group of the series of vinylsulfonyl, β-chloroethylsulfonyl, β-acetoxyethylsulfonyl, β-(3-sulfobenzoyloxy)-ethylsulfonyl, β-sulfatoethylsulfonyl, β-thiosulfatoethylsulfonyl, β-phosphatoethylsulfonyl, β-sulfatoethylsulfonylmethylamino or vinylsulfonylmethylamino.

3. The dyeing preparation as defined in claim 1, which comprises from 5 to 25 weight % of the dyestuff C.I. Reactive Yellow 37, from 5 to 25 weight % of ε-caprolactam, from 1 to 10 weight % of an anionic dispersing agent which is one or more sulfosuccinic acid derivates and from 1 to 6 weight % buffer, said dyeing preparation exhibiting a pH of from 3 to 7.

4. The dyeing preparation as defined in claim 3, wherein the weight percentage of ε-caprolactam is from 10 to 20.

5. The dyeing preparation as defined in claim 3, wherein the weight % of the anionic dispersing agent is from 1 to 5.

6. The dyeing preparation as defined in claim 3, wherein the pH is from 4.5 to 6.5.

7. The dyeing preparation as defined in claim 1, wherein m is 1.

8. A method of dyeing or printing fiber material made from wool, silk, polyamide or natural or regenerated cellulose, or a fiber mixture containing one or several of said fiber materials, which comprises applying to said fiber material or fiber mixture a dyeing preparation as defined in claim 1.

* * * * *